United States Patent [19]

Kalfoglou

[11] Patent Number: 4,869,732
[45] Date of Patent: Sep. 26, 1989

[54] DEOXYGENATION OF AQUEOUS POLYMER SOLUTIONS USED IN ENHANCED OIL RECOVERY PROCESSES

[75] Inventor: George Kalfoglou, Houston, Tex.

[73] Assignee: Texaco Inc., White Plains, N.Y.

[21] Appl. No.: 289,104

[22] Filed: Dec. 23, 1988

[51] Int. Cl.$^4$ .................. B01D 19/00; B01D 53/22
[52] U.S. Cl. .................................... 55/16; 55/38; 55/55
[58] Field of Search .................. 55/16, 38, 51, 55, 158, 55/159, 189, 195

[56] References Cited

U.S. PATENT DOCUMENTS

| | | | |
|---|---|---|---|
| 3,735,562 | 5/1973 | Mousseau, Jr. et al. | 55/158 |
| 3,751,879 | 8/1973 | Allington | 55/189 X |
| 3,778,971 | 12/1973 | Granger et al. | 55/159 |
| 4,020,230 | 4/1977 | Mahoney et al. | 55/16 X |
| 4,268,279 | 5/1981 | Shindo et al. | 55/158 X |
| 4,325,715 | 4/1982 | Bowman et al. | 55/158 |
| 4,469,495 | 9/1984 | Hiraizumi et al. | 55/189 |
| 4,516,984 | 5/1985 | Warner et al. | 55/189 X |
| 4,531,954 | 7/1985 | Klein | 55/159 |
| 4,613,441 | 9/1986 | Kohno et al. | 55/158 X |
| 4,729,773 | 3/1988 | Shirato et al. | 55/159 X |

FOREIGN PATENT DOCUMENTS

| | | | |
|---|---|---|---|
| 2658285 | 10/1977 | Fed. Rep. of Germany | 55/158 |
| 59-216606 | 12/1984 | Japan | 55/189 |
| 60-048104 | 3/1985 | Japan | 55/159 |
| 60-257810 | 12/1985 | Japan | 55/55 |
| 62-132509 | 6/1987 | Japan | 55/189 |
| 63-111909 | 5/1988 | Japan | 55/158 |
| 63-151307 | 6/1988 | Japan | 55/158 |
| 2097281 | 11/1982 | United Kingdom | 55/55 |

*Primary Examiner*—Robert Spitzer
*Attorney, Agent, or Firm*—Jack H. Park; Kenneth R. Priem; Harold J. Delhommer

[57] ABSTRACT

The invention is a method for lowering the oxygen content of an aqueous polymer solution below 100 ppb, which comprises recirculating an aqueous polymer solution through microporous hollow fibers grouped in a module having an air tight interior which surrounds the hollow fibers. A vacuum is applied to the interior of the fiber module to enhance transportation of oxygen through the walls of the hollow fibers and out of the module interior.

5 Claims, No Drawings

DEOXYGENATION OF AQUEOUS POLYMER SOLUTIONS USED IN ENHANCED OIL RECOVERY PROCESSES

BACKGROUND OF THE INVENTION

This invention relates to the removal of oxygen from an aqueous solution. More particularly, the invention concerns a method for lowering the oxygen content of an aqueous polymer solution so as to prevent oxidative degradation of the polymer solution.

Removal of oxygen from certain polymer systems used in enhanced oil recovery processes is mandatory, if such chemical systems are to be injected in moderate to high temperature reservoirs. Deoxygenation of aqueous polymer solutions containing partially hydrolyzed polyacrylamides, polysaccharides, and other synthetic high temperature polymers prevents oxidative degradation, especially at elevated temperatures. An oxygen level of about 1 ppb or less in polyacrylamide solutions has been reported to be necessary to inhibit oxidative degradation at high temperatures. Please see, Ryles, R. G. "Elevated Temperature Testing of Mobility Control Reagents," SPE Paper No. 12008 Presented at the 58th Annual Technical Conference of the Society of Petroleum Engineers, San Francisco, Oct. 5-8, 1983.

Oxygen scavenging is usually accomplished by adding oxygen scavenging chemicals into the chemical solution. For example, sulfur-containing antioxidants, water-soluble alcohols or glycols and thiourea are used as described in U.S. Pat. No. 4,218,327. Amine bisulfite scavengers are described in U.S. Pat. No. 3,976,593, and aldehyde scavengers are disclosed in U.S. Pat. No. 3,800,877. A number of other oxygen scavenging chemicals have been disclosed in the patent literature.

For best results and to avoid chemical incompatibility problems between the oxygen scavengers and hardness ($Ca^{++}$) ions found in formation brine, and also to minimize free radical generation by the action of chemical scavengers, it is desirable to use as small a quantity of scavengers as possible. To keep the amount of these additives to a minimum, one must remove as much oxygen as possible from the oil recovery system prior to adding oxygen scavengers. This is accomplished in part by purging or blanketing aqueous solutions of polymers with nitrogen in tanks. However, blanketing solutions with nitrogen is not effective in reducing oxygen levels down to very low levels. Bubbling $N_2$ through aqueous surfactant solutions or through polymer solutions prepared using stock polymer solutions in emulsion form creates foaming in the preparation tank which is detrimental to the solution preparation process.

U.S. Pat. No. 3,751,879 discloses a tubular exchanger for reducing the dissolved gas concentration in a liquid, wherein the dissolved gas passes through a gas permeable membrane. U.S. Pat. No. 4,268,279 discloses a gas transfer process with a hollow fiber membrane wherein gaseous components contained in two different liquids are transferred to the opposite liquid with a hollow fiber membrane, preferably a fluorinated polyolefin. Microporous polyethylene hollow fibers and a process of preparing them are disclosed in U.S. Pat. No. 4,020,230. Similar porous hollow fibers made of polypropylene are described in U.S. Pat. No. 4,055,696.

A process for decreasing the oxygen content of a fluid is described in U.S. Pat. No. 4,516,984. This patent discloses using teflon, polysilicon, polypropylene and polyethylene membranes in the shape of tubing to run chemical solutions through a vessel containing an oxygen scavenging solution. The tubing, which is permeable to oxygen, passes oxygen into the oxygen scavenging solution, lowering the oxygen content of the fluid.

SUMMARY OF THE INVENTION

The invention is a method for lowering the oxygen content of an aqueous polymer solution below 100 ppb, which comprises recirculating an aqueous polymer solution through microporous hollow fibers grouped in a module having an air tight interior which surrounds the hollow fibers. A vacuum is applied to the interior of the fiber module to enhance transportation of oxygen through the walls of the hollow fibers and out of the module interior.

DETAILED DESCRIPTION

Hollow fiber membranes combine the features of microporous membrane films with the advantages of hollow fiber geometry. Hollow fiber geometry offers the advantages of compact size because of high membrane surface area to volume ratio, a self-supporting structure, and the ability to group numerous fibers together in a small module or cylinder.

Unlike solid polymer membranes where transport of permeants is controlled by a diffusion mechanism, permeant transport in microporous hollow fibers is controlled by connective mass transfer. The fiber wall is composed of a series of parallel interconnected pores providing a tortuous path from one side of the membrane fiber wall to the opposite side. These pores readily allow the flow of gases, but since the wall surfaces are hydrophobic, a barrier is formed to the aqueous solvent and dissolved solutes.

Hollow fiber modules are generally constructed of polyethylene or polypropylene, although other construction materials may be used. Hollow fibers may be made by methods well-known in the art, such as those disclosed in U.S. Pat. Nos. 4,020,230 and 4,055,696, the disclosures of which are incorporated herein by reference. The fibers may have wall thicknesses varying from about 20 microns to about 50 microns, different pore sizes, different interior diameters and varying porosity. Hollow fibers have inner diameters of about 200 to 800 microns, wall thicknesses of about 20 microns to about 50 microns, pore size of about 0.01 to about 0.05 microns, and porosity generally ranging between 20% and 40%. The ability to place 10,000 or 20,000 or more of these hollow fibers within a fiber module permits large transfer surface areas within a small module. For instance, a Celanese hollow fiber module trademarked CELGARD X-10 contains 15,000 fibers with a total transfer surface area of 10 square feet in a cylindrical module that is 9 inches long with a 1.5 inch outer diameter. The porosity of the fibers is 20% with an average pore size of about 0.1 microns. Interior diameter of the fibers ranges from about 100 to 400 microns and the wall thickness is about 25 microns.

The invention may be carried out by pumping aqueous polymer solution from a reservoir into microporous hollow fibers grouped in at least 1 module and then back into the reservoir. The polymer solution is repeatedly cycled through the hollow fiber module or pumped through multiple modules set up in series. For most enhanced oil recovery uses, the polymer solution should be recirculated until the oxygen content of the solution falls below about 5 ppb. In some cases, this recirculation should be continued until oxygen content falls to about 1 ppb. An oxygen meter may be placed somewhere in the flow cycle of the polymer solution to measure the oxygen content of the fluid. An ideal location is between the hollow fiber module and the reservoir.

Optionally, an oxygen scavenging chemical may be added to the polymer solution during recirculation or after recirculation through the fiber module. Polymer fluid in the reservoir should also be blanketed by an oxygen-stripped, inert gas such as nitrogen.

The speed with which oxygen is removed from the polymer solution can be increased by increasing the temperature of the solution. Oxygen has a lower aqueous solubility at increased temperature. Thus, the polymer fluid will release oxygen at a faster rate if its temperature is increased to above 40° C., for example.

The following examples further illustrate the novel method for lowering the oxygen content of polymer solutions of the present invention. These examples are given by way of illustration and not as limitations on the scope of the invention. Thus, it should be understood that the invention process may be varied to achieve similar results within the scope of the invention.

EXAMPLE 1

A recirculating fluid cycle was set up in the laboratory with a fluid reservoir, a recirculating pump, a microporous hollow fiber module, and an oxygen meter, all in series. A 2 liter polymer fluid reservoir was blanketed with oxygen-stripped nitrogen gas. A magnetic gear pump manufactured by Ismatec/Cole Palmer was used to pump polymer solution from the reservoir to a microporous hollow fiber module and then back to the fluid reservoir after passing through an oxygen meter. The oxygen meter flow cell was manufactured by Orbisphere Labs.

The hollow fiber module was a G-200/28 module manufactured by Celanese Corp. The module contained 18,500 fibers having a 200 micron inner diameter, a 28 micron wall thickness, and an average 0.03 micron pore size. The total surface area of the fibers in the module was 2.6 $m^2$.

The polymer solution to be deoxygenated was 1000 g of an aqueous 2000 ppm synthetic polymer trademarked HE POLYMER B sold by Drilling Specialties Inc. It is designed to be used in a high temperature environment. The makeup water contained 12.5% sodium chloride by weight.

The oxygen content of the polymer solution was initially 7.15 ppm. After recirculating the 1000 g of polymer solution at a rate of 120 ml per minute for 5.5 hours with a 1 ml vacuum applied to the interior shell side of the hollow fiber module, the oxygen level of the polymer solution dropped to 1.6 ppb. This low oxygen level of the polymer solution indicates that the microporous hollow fiber technique may be used to deoxygenate polymer solutions to an extremely low oxygen level. The interim and final oxygen concentrations of the polymer solution in this experimental run are indicated below in Table 1.

TABLE 1

| FLOW TIME | $O_2$ |
|---|---|
| — | 7.15 ppm |
| 15 Min. | 400 ppb |

TABLE 1-continued

| FLOW TIME | $O_2$ |
|---|---|
| 30 Min. | 120 ppb |
| 90 Min. | 30 ppb |
| 180 Min. | 17.5 ppb |
| 240 Min. | 3 ppb |
| 310 Min. | 1.7 ppb |
| 330 Min. | 1.6 ppb |

EXAMPLE 2

The same procedure and apparatus of Example 1 was employed to deoxygenate a different aqueous polymer solution in Example 2. 1000 g of an 800 ppm solution of a polysaccharide trademarked FLOCON MT sold by Pfizer Inc. was prepared in 12.5% sodium chloride by weight makeup water. The solution was circulated through the said hollow fiber module as Example 1 at a flow rate of 120 ml per minute.

Table 2 below indicates that the oxygen content of the polysaccharide polymer solution dropped to 6.9 ppb after three and a half hours. After six and two-thirds hours, the oxygen content dropped to an extremely low 1.7 ppb.

TABLE 2

| FLOW TIME | $O_2$ |
|---|---|
| — | 7.15 ppm |
| 10 Min. | 410 ppb |
| 30 Min. | 80 ppb |
| 60 Min. | 30 ppb |
| 150 Min. | 10.8 ppb |
| 210 Min. | 6.9 ppb |
| 290 Min. | 3.2 ppb |
| 350 Min. | 2.2 ppb |
| 400 Min. | 1.7 ppb |

Many other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. A method for lowering the oxygen content of an aqueous polymer solution below 100 ppb, which comprises:
   recirculating an aqueous polymer solution through microporous hollow fibers grouped in a module of said hollow fibers,
   said module of fibers having an airtight interior which surrounds the hollow fibers; and
   applying a vacuum to the interior of the module of fibers to enhance transportation of oxygen through the walls of the hollow fibers and out of the module interior.

2. The method of claim 1, wherein the aqueous polymer solution is recirculated until the oxygen content of the solution falls below about 5 ppb.

3. The method of claim 1, further comprising adding an oxygen scavenging chemical to the solution after recirculation through the module of fibers.

4. The method of claim 1, wherein the hollow fibers have a wall thickness of about 20 microns to about 50 microns.

5. The method of claim 1, further comprising increasing the temperature of the polymer solution above about 40° C.

* * * * *